Nov. 7, 1967     G. B. STONE     3,351,395
CONVEYOR BEARING
Filed Sept. 8, 1966
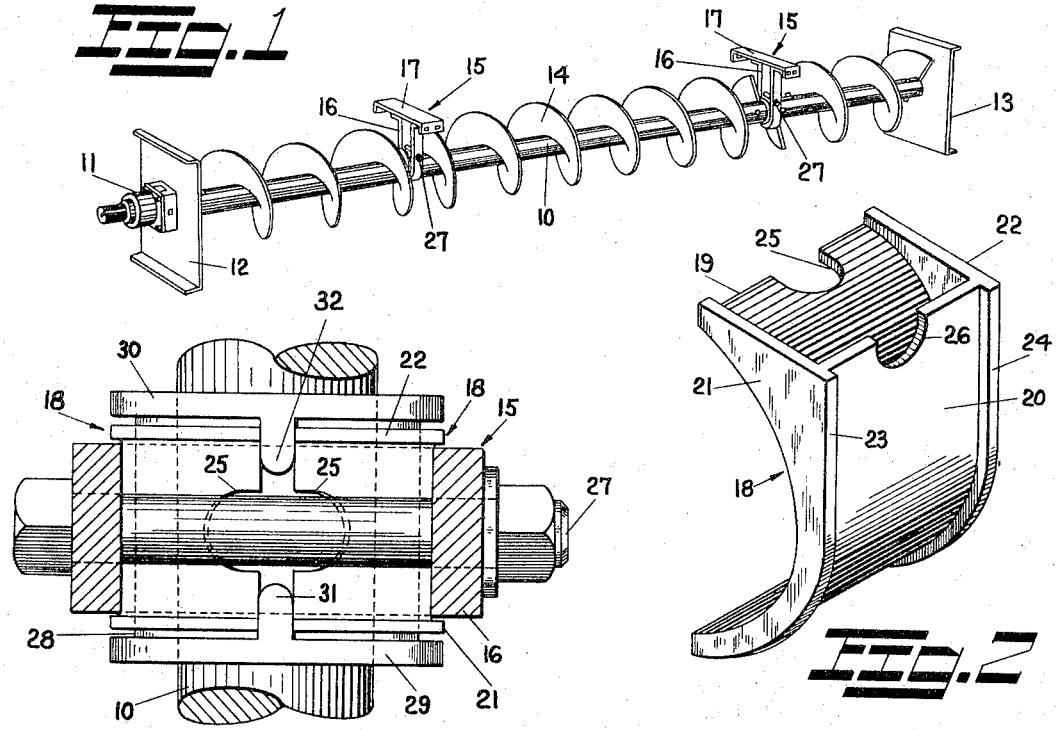
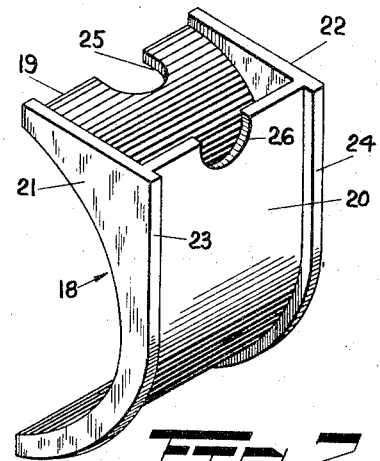
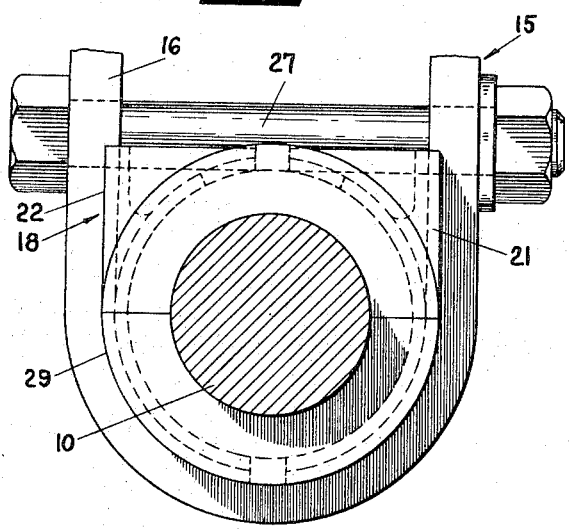
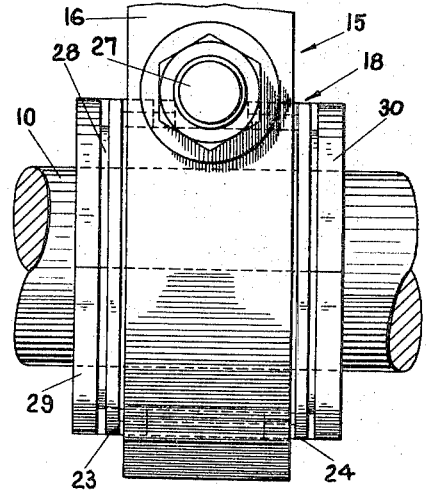
INVENTOR.
GUTHRIE B. STONE
BY *Albert A. Mahassel*
ATTORNEY

United States Patent Office 3,351,395
Patented Nov. 7, 1967

3,351,395
CONVEYOR BEARING
Guthrie B. Stone, Honeoye, N.Y., assignor to Stone Conveyor Company, Inc., Honeoye, N.Y.
Filed Sept. 8, 1966, Ser. No. 578,047
1 Claim. (Cl. 308—27)

ABSTRACT OF THE DISCLOSURE

A U-shaped bearing hanger for a screw conveyor having bearing retainers fixedly assembled therein which are adapted to support opposed bearing inserts of identical configuration.

---

This invention pertains to conveyors of the screw type and more particularly, to an improvement in the hanger type bearings therefor.

It is a general object of the invention to provide U-shaped, strap type conveyor bearing hangers with an improved means for accommodating two-piece bearing members.

A further object is that of providing an improved means for retaining conveyor bearings which permits quick and easy assembly and disassembly thereof, which is relatively inexpensive to manufacture and which requires a minimum amount of attention and maintenance.

A further and more specific object is that of providing an improved bearing retaining means for conveyors having U-shaped bearing strap hangers that will accommodate opposed bearing inserts of identical configuration.

Further objects and advantages of the invention will become apparent from the following more detailed disclosure.

Screw type conveyors to which the instant invention is applicable are adapted to convey many types of dry materials such as sand or the like and usually include a trough-like member having therein a centrally disposed and longitudinally extending rotatable shaft. This shaft forms a screw within the trough by means of a helix formed blade element fixedly attached to the outer diameter of said shaft which extends for substantially the full length of the latter. The ends of the shaft are journaled in suitable bearings provided in the end members of the trough and depending on the length of the screw. One or more hanger type bearings are utilized to guide and support the shaft intermediate its ends. These bearings are available in different forms such as a depending arm from a suitable support having at its lower end an integrally formed hub for housing anti-friction bearings or bushings which are available made from the various known bearing materials.

A common, dependable and yet relatively inexpensive form of hanger bearing used rather extensively is that of the U-shaped strap type having provisions in the arcuated portion thereof for retaining split type or two-piece bushings. The means for retaining these bushings provides an uncomplicated and quick means for replacement of said bushings when required.

Prior to the instant invention the two-piece bushings carried by these U-shaped strap type bearing hangers had to be of two different configurations in order to be securely held by said hangers. The lower half of the bushing's outer surface conformed to the arcuated portion of the hanger while the outer surface of the upper half of the bushing had a configuration for cooperating with a cross bolt extending between the leg portions of the hanger which serves to fixedly position both bushing elements in operating position.

The device according to the instant invention permits the use of two-piece bushings in this type of bearing hanger which are of identical configuration. A particular advantage of a construction of this sort is the fact that users of such bushings need only to order and stock a single type for replacement purposes.

The hanger portion of the instant bearing device is of conventional design, it being U-shaped and of the strap type. A pair of opposed arcuated bearing retainers are adapted to assemble in the curved portion of the hanger and are held herein by means of a cross bolt extending between the leg portions of the hanger with the outside diameter of said bolt being in engagement with recesses formed in the upper portion of each bearing retainer. A pair of bushing halves of like configuration are adapted to assemble within the confines of the opposed bearing retainers and are firmly positioned therein by means of integrally formed projections on each bushing half which when in assembled position are interposed between the ends of said bearing retainers.

The invention will hereinafter be described in greater detail by reference to a specific embodiment thereof as illustrated in the accompanying figures of drawing, wherein:

FIG. 1 is a perspective view of the screw portion of a conveyor screw showing the bearing elements according to the invention applied thereto;

FIG. 2 is a perspective view of one of the two bearing retainers utilized to position the two-piece bushings within a hanger member;

FIG. 3 is a plan view showing the leg portions of a hanger member in section and showing the cross bolt retaining means for positioning the opposed bearing retainers that substantially encompasses the two-piece bushings;

FIG. 4 is an end view of the various elements shown in FIG. 3; and

FIG. 5 is a side view of the various elements shown in FIGS. 3 and 4.

Referring to the drawings wherein only as much of a conventional screw conveyor structure is depicted as is necessary to a complete understanding of the invention, there is shown in FIG. 1 a shaft member 10 which is supported for rotary movement adjacent its ends in suitable bearing members 11 (one only shown in FIG. 1). These bearing members are fixedly attached to the end members of the conveyor which are identified by numerals 12 and 13, respectively. Normally these end members are interconnected by a trough which has been omitted for the purpose of illustrating the internal portion of a conveyor.

Shaft member 10 forms the screw portion of the conveyor by means of a helix formed blade element 14 that is fixedly attached to the outer diameter of said shaft by any suitable means and which extends for substantially the full length thereof.

It is obvious that the length of the shaft 10 will vary to meet the needs of a particular condition and hanger type bearings generally indicated by numeral 15 are utilized to support and guide said shaft intermediate its ends as shown in FIG. 1.

The particular type of hanger bearing to which the instant invention is applicable includes a U-shaped hanger strap 16 which depends from a mounting bracket 17 (FIG. 1).

A pair of arcuated bearing retainers, identified generally by numeral 18 (one only shown in FIG. 2), are disposed in opposed relation within the curved portion of the hanger strap 16.

These bearing retainers are preferably of a molded construction and include an inner semi-circular surface 19 of a width slightly greater than the width of the hanger strap 16.

An outer surface 20 of equal width to surface 19 extends from the latter and conforms in shape to one side of the curved portion of the hanger strap 16 with which it is adapted to abut when in operating position. Curved plate members 21 and 22, respectively, form the ends of the bearing retainers 18 with the inner edges thereof blending with the semi-circular surface 19 and the outer surfaces conforming to the shape of the outer surface 20.

The outer edges of the plate members 21 and 22 extend slightly beyond the limits of the outer surface 20 and form flanges 23 and 24 (FIG. 2) which overlap the sides of the hanger strap 16 thereby preventing endwise movement of the bearing retainers 18 when assembled in said hanger strap.

In operating position a pair of these bearing retainers 18 are disposed in opposed relation in the curved portion of the hanger strap 16 and each is provided with a pair of aligned recesses, one being centrally located in the upper portion of surface 19 which is identified by numeral 25 and the other in the outer surface 20 which is depicted by numeral 26 (FIG. 2).

A cross bolt 27 is adapted to assemble in aligned apertures provided in the leg portions of the hanger strap 16 and is disposed in such a manner as to permit the shank portion of said bolt to fit into and extend through the recesses 25 and 26 of each bushing half thereby fixedly positioning the retainers in the curved portion of the strap hanger and preventing any possible vertical movement thereof.

A pair of split type bushings or so-called bearing inserts 28 of like configuration assemble in opposed relation within the space provided between the opposed bearing retainers. The ends of these bushings are provided with integrally formed flanges 29 and 30 (FIGS. 3 and 5) which are adapted to overlap the curved plate members 21 and 22 of the bearing retainers thereby preventing longitudinal movement of the bearing inserts on the shaft 10 which extends therethrough.

The pair of opposed bushings 28 are held against rotary movement by means of integrally formed projections 31 and 32 (FIG. 3) which extend inwardly from the flanges 29 and 30, respectively, and are interposed between the ends of the bearing retainers 18.

In operation, the strap type hanger bearings support and guide the shaft 10 during the performance of its intended function and the number thereof is dependent upon the length of said shaft.

The replacement of the two-piece pushings when need requires is accomplished with very little effort and down time of the conveyor. Such replacement simply requires removing the cross bolt 27 and the disconnection of the U-shaped hanger strap 16 from the mounting bracket 17. The hanger strap is then lowered clear of the bearing retainers and bushings which are then accessable for removal and replacement. By simply re-attaching the hanger strap to its mounting bracket and the replacement of the cross bolt the conveyor is again ready for normal operation.

Unless damaged extensively the bearing retainers need not be replaced and unlike this form of bearing hanger of the prior art permits the use of split type bushings of like configuration. Additionally, users of this type of hanger bearing need only to stock one type bushing for repairs which are commercially available in numerous types of bearing materials.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claim.

I claim:

For a screw conveyor having U-shaped bearing hangers adapted to support opposed bearing inserts of identical configuration which comprises
 (a) a pair of opposed arcuated bearing retainers disposed in close proximity in said bearing hangers,
 (b) a cross bolt traversing the distance between the sides of said bearing hangers and extending through aligned recesses in the top of each of said bearing retainers for positioning the latter within the bearing hangers, and
 (c) integrally formed projections on each of said bearing inserts interposed between the ends of said pair of bearing retainers for fixedly positioning the bearing inserts therein.

References Cited

UNITED STATES PATENTS

| | | | |
|---|---|---|---|
| 701,636 | 6/1902 | Smith et al. | 198—213 X |
| 715,448 | 12/1902 | Willson | 198—213 |
| 729,356 | 5/1903 | King et al. | 308—27 X |
| 822,183 | 5/1906 | Chamberlin | 308—27 |
| 2,175,978 | 10/1939 | Swingle | 308—30 |
| 2,524,948 | 10/1950 | Whitney | 198—213 |
| 3,144,125 | 8/1964 | Medley | 198—213 |
| 3,289,819 | 12/1966 | Steinmetz | 198—213 |

EVON C. BLUNK, *Primary Examiner.*

M. L. AJEMAN, *Assistant Examiner.*